United States Patent [19]

McDaniel

[11] Patent Number: 5,475,924
[45] Date of Patent: Dec. 19, 1995

[54] TUBING CUTTER

[76] Inventor: William A. McDaniel, 1915 Loyd Cir., Pearl, Miss. 39208

[21] Appl. No.: 432,808

[22] Filed: May 2, 1995

[51] Int. Cl.$^6$ .................................................. B23D 21/06
[52] U.S. Cl. .................................................. 30/102; 30/94
[58] Field of Search .................................. 30/92, 95, 99, 30/101, 102; 81/126, 182

[56] References Cited

U.S. PATENT DOCUMENTS

| | | |
|---|---|---|
| 86,322 | 1/1869 | Rowe . |
| 649,334 | 5/1900 | Meloos . |
| 2,502,245 | 3/1950 | Charles . |
| 2,753,744 | 7/1956 | Therien ........................................ 30/102 |
| 3,118,227 | 1/1964 | Samuels et al. ........................... 30/102 |
| 3,145,469 | 8/1964 | Petersen ...................................... 30/102 |
| 3,216,110 | 11/1965 | Stallings . |
| 3,335,492 | 8/1967 | Spiro . |
| 3,651,569 | 3/1972 | Arnot . |
| 3,714,712 | 2/1973 | Hoffman . |
| 3,796,115 | 3/1974 | Dane . |
| 4,763,413 | 8/1988 | Rothenberger .............................. 30/94 |
| 4,769,911 | 9/1988 | Araki ............................................ 30/94 |
| 5,007,313 | 4/1991 | Jeromson . |
| 5,065,650 | 11/1991 | Anderson . |
| 5,099,577 | 3/1992 | Hutt ............................................ 30/101 |
| 5,206,996 | 5/1993 | McDaniel .................................. 30/101 |

FOREIGN PATENT DOCUMENTS 1408703 10/1975 United Kingdom .

Primary Examiner—Hwei-Siu Payer
Attorney, Agent, or Firm—Richard C. Litman

[57] ABSTRACT

A tool for cutting tubing, light pipe, and other similar cylindrical materials includes a circular cutting wheel or blade and opposite guide rollers in a spring loaded hand clamp frame. The frame spring urges the two opposed handles apart, thereby urging the two opposed jaws together, and thereby precluding any need for additional adjustment of cutting pressure during the cutting operation. The tool may be applied with only one hand to the material to be cut, and easily rotated about the material with only one hand, as no further adjustment of blade depth or cutting pressure is required. The relationship between the cutting blade and guide rollers is constant, with the center of the cutting blade always positioned linearly along the perpendicular bisector of the line between the two guide rollers, even though the opposed jaws move arcuately relative to one another. The guide rollers are affixed within one jaw, with the cutting blade portion slidably positioned relative to the guide rollers. The cutting blade portion is not positively connected to the opposite jaw, in order to allow the linear relationship of the guide rollers and cutting blade, and arcuate relationship of the two jaws of the tool. The guide roller and cutting blade relationship allows material of any practicable diameter to be cut by the present tool, without an asymmetrical force being placed on the material and causing it to be expelled from the jaws.

10 Claims, 3 Drawing Sheets

FIG. I

TUBING CUTTER

FIELD OF THE INVENTION

The present invention relates generally to hand operated cutting tools, and more specifically to a tool for cutting tubing, pipe, and other cylindrical articles. The present cutter utilizes a spring to bias the two jaws together to urge the cutting wheel toward the guide rollers, yet provides accurate alignment of the cutting wheel relative to the rollers without any positive engagement of the cutting wheel with its adjacent jaw member.

BACKGROUND OF THE INVENTION

Hand operated tools for cutting tubing, light pipe, and other cylindrical materials are well known. Such devices Generally include at least one cutting blade or wheel positioned opposite at least two guide rollers, to capture the material being cut between the cutting blade and rollers at three contact points. The tool is rotated about the material being cut (or the material is rotated within the tool) to cause the cutting blade to pass circumferentially about the material.

As the material is being cut, the bottom of the groove formed in the cut material of course defines a smaller diameter than the uncut material. Accordingly, some means must be provided to advance the cutting blade toward the guide rollers, in order to continue to deepen the cut. Heretofore, the general method used for such cutting blade advancement was to manually and threadedly advance the cutting blade after each turn or two about the material; the cutting blade is positively secured by a threaded screw mechanism in such tools.

Such manual advancement of the cutting blade is tedious, and can lead to damage and/or misalignment of the rotating cutting blade if too much force is used to advance the blade. Obviously, such a tool requires a fair amount of patience on the part of the user.

Accordingly, a spring biased tubing cutter tool has been developed, in which the cutting blade is urged toward the guide rollers by spring means. Various embodiments of this tool are disclosed in the present inventor's previously issued U.S. Pat. No. 5,206,996, discussed in detail in the Description Of The Prior Art further below. However, other features (e. g., proper alignment of the cutting blade wheel relative to the guide rollers) must also be considered in order to provide for cutting different diameters of material. The present inventor's previously issued patent provided for such by various means in at least some embodiments, but those mechanisms all incorporated the positive capture of the cutting blade in the jaw opposite the guide roller jaws, with the accompanying complications of attempting to provide linear movement of the cutting blade relative to the rollers, in an arcuately moving jaw assembly.

The present invention responds to this problem by providing a simplified means of maintaining linear alignment between the cutting blade and the guide rollers, by securing the cutting blade within the tool in such a way that it is not positively captured by the jaw opposite the guide roller jaw. The cutting blade holder slides relative to the cutting blade jaw, thereby allowing the jaws to move arcuately relative to one another, while still allowing the cutting blade to move linearly toward or away from the guide rollers to maintain proper alignment on any material diameter.

DESCRIPTION OF THE PRIOR ART

U. S. Pat. No. 86,322 issued to Philip C. Rowe on Jan. 26, 1869 describes a Wrench, which tool is convertible to a tubing or pipe cutter. A spring is included which biases the jaws to an open position, rather than closed as in the present invention. The force required for cutting is provided by manual pressure from the operator, rather than by spring pressure as in the present tool.

U.S. Pat. No. 649,334 issued to Iver P. Meloos on May 8, 1900 describes a Key Wrench adapted for inserting, removing, and deforming the split ends of a cotter key. The handles of the Meloos tool are foldable, as in the case of one of the embodiments of the present inventor's issued patent (although it is noted that the folding axes of the two tools are 90 degrees from one another). Thus, the Meloos tool is more closely related to a tool of the present inventor's issued patent, than to the present invention.

U.S. Pat. No. 2,502,245 issued to Henry E. Charles on Mar. 28, 1950 describes a Cable And Wire Stripper comprising guide roller and cutting wheel attachments which are secured to the existing jaws of a conventional Vise Grip (tm) type pliers. Wire is pulled tangentially between the blade and rollers, to cut the insulation longitudinally. The Charles tool cannot make a circumferential cut, as the material cannot be inserted between the tool elements due to the closure of the plier jaws. Moreover, such Vise Grip type pliers use an over center lever mechanism, with a relatively weak spring urging separation of the jaws, rather than a spring urging the jaws together to apply cutting pressure, as in the present invention. Finally, the cutting blade portion of the present tool is not positively secured to its respective jaw, whereas both portions of the Charles tool are clamped to the jaws.

U.S. Pat. No. 3,216,110 issued to Douglas S. Stallings on Nov. 9, 1965 describes Operating Heads For Insulation Strippers, which primarily operate in the manner of the Charles tool discussed above. However, means providing for circumferential cuts is also provided by Stallings. A spring is provided to separate the cutting blade and rollers, rather than to urge them together, as in the present invention. Stallings uses a threaded bolt to lever the cutting wheel toward the rollers, unlike the spring means of the present tool. Moreover, the Stallings cutting blade is positively captured in the jaw opposite the rollers, unlike the present invention.

U.S. Pat. No. 3,335,492 issued to Lloyd W. Spiro on Aug. 15, 1967 describes a Self-Centering Spring Biased Tube Cutter generally comprising a circular configuration. The Spiro device is primarily intended for use in confined spaces, and is devoid of radially extending handles. The spring provided by Spiro is relatively weak, and does nothing more than urge the two semicircular halves together to center the device on the tube to be cut. Cutting pressure must be applied by a threaded screw, which secures the two halves together. The present invention utilizes spring pressure to exert all the cutting force. Also, Spiro positively captures the cutting blade in one side of his tool, unlike the present invention.

U. S. Pat. No. 3,651,569 issued to Alfred E. R. Arnot on Mar. 28, 1972 describes a Device For Working A Cylindrical Work-Piece. The device includes a gear train providing for the advance of the cutting blade or wheel, rather than spring pressure, as in the present invention. Various embodiments are disclosed using generally the same mechanical principle of operation.

U. S. Pat. No. 3,714,712 issued to Joseph W. Hoffman on Feb. 6, 1973 describes a Cutting Or Grooving Tool. While spring pressure is used to urge the cutting blade against the material to be cut, the device completely encircles the pipe in order to provide the necessary strength to cut or groove heavy pipe. Thus, the device may only be installed or removed from one end of the pipe, rather than slipped over from one side as in the case of the present invention. Also, both the cutting or grooving means and rollers are positively captured within their respective sides of the tool. The device includes a stop at one end, precluding insertion of material completely therethrough. Insertion of work laterally and completely through the tool jaws is provided by the present tool.

U. S. Pat. No. 3,796,115 issued to Robert L. Dane on Mar. 12, 1974 describes a Wire Stripping Tool using a resilient leaf spring as both the handle means and also to urge the two cutting edges apart, whereas the present tool has jaws urged together by spring means. The Dane device is strictly for stripping the insulation from the end of a wire, as the wire is placed in the tool generally parallel to its major axis until it contacts a stop, unlike the present invention where the material to be cut is placed transversely across the jaws. Both the cutting jaws of the Dane device are integral with the handles, unlike the present tool.

U.S. Pat. No. 4,763,413 issued to Gunter Rothenberger on Aug. 16, 1988 describes a Chain Tube Cutter. The device is closely related to a chain-type pipe wrench, but includes a plurality of cutting blades or wheels disposed about the connecting pin axes of the chain, unlike the present invention.

U.S. Pat. No. 4,769,911 issued to Masaharu Araki on Sep. 13, 1988 describes a Pipe Cutting Device which advances the cutting blade similarly to the means described in the Arnot patent discussed above. While Araki notes manual operation of his tool in the abstract, only powered operation is disclosed in the drawings. The cutting blade is positively captured within the accompanying portion of the tool, and no spring clamping means to urge the cutting blade into the work is disclosed.

U.S. Pat. No. 5,007,313 issued to James R. Jeromson, Jr. et al. on Apr. 16, 1991 describes Pliers having an adjustably positioned fulcrum, allowing the same tool to be adjusted for use as internal or external snap ring type pliers. The handle portions are urged apart by a spring, as in the present tool. However, no means for cutting any material is disclosed by Jeromson, Jr. et al.

U.S. Pat. No. 5,065,650 issued to J. Edward C. Anderson et al. on Nov. 19, 1991 describes a Hand Tool similar to the tool of the '313 patent described immediately above. The '650 patent to Anderson et al. is a divisional patent to the above described '313 patent, and is no more closely related to the present invention than the '313 patent.

U.S. Pat. No. 5,099,577 issued to Heinz Hutt on Mar. 31, 1992 describes a Releasable Knife Axle For Tube Cutter, comprising opposite first and second jaws with guide rollers and a cutting blade respectively therein. The cutting blade is removable, but is positively captured within its jaw during operation of the tool. The jaws cause the blade to move arcuately relative to the guide rollers, unlike the linear alignment provided by the present tool at all times. The blade is held against the material by a threaded bolt which holds the jaws together, rather than spring means.

U.S. Pat. No. 5,206,996 issued to William A. McDaniel on May 4, 1993 discloses several embodiments of Tubing Cutters, which in each case provide springs urging the cutting blade toward the guide rollers, to force the cutting blade against the work held therein. The present invention relies upon the same principle, but goes beyond the embodiments of the '996 patent issued to the same inventor. The present cutting blade portion is positively secured to the guide roller portion by mating linear tracks therebetween, thereby maintaining the position of the cutting blade precisely along the perpendicular bisector of the line between the two guide rollers. This is an important point of the earlier '996 patent, in order to preclude non-diametric compressive forces on the material being cut, from forcing the material from its work position between the jaws. However, the present inventor's earlier issued '996 patent incorporates relatively complex means of holding the cutting blade portion to the cutting blade jaw, and accommodating the arcuate relative movement of the two jaws and the linear relative movement of the cutting blade and guide roller portions of the tool. The present invention solves this problem by securing the cutting blade portion only to the opposite guide roller portion and jaw, with the cutting blade jaw being used only to bear against and force the cutting blade against the workpiece.

Finally, British Patent Publication No. 1,408,703 to Alfred E. Lund et al. and published on Oct. 1, 1975 describes Improvements In Or Relating To Cable Cutters, with a ratcheting handle provided for greater leverage in applying cutting pressure to opposite blade members in the cutting head portion of the tool. The work does not rotate relative to the tool during cutting. The only springs are relatively small, and provide engagement of the ratchet pawls.

None of the above noted patents, taken either singly or in combination, are seen to disclose the specific arrangement of concepts disclosed by the present invention.

SUMMARY OF THE INVENTION

By the present invention, an improved tubing cutter is disclosed.

Accordingly, one of the objects of the present invention is to provide an improved tubing cutter which is adapted for the diametric cutting to length of tubing, light pipe, and other cylindrical materials.

Another of the objects of the present invention is to provide an improved tubing cutter which provides essentially constant cutting pressure between the cutting blade and the opposite guide rollers, and which requires no manual adjustment of spacing between the cutting blade and guide rollers during the cutting operation. Yet another of the objects of the present invention is to provide an improved tubing cutter which utilizes spring means to urge the cutting blade and guide roller portions together during cutting operations, and which spring means provides all of the pressure required to urge the cutting blade into the material for a proper cut.

Still another of the objects of the present invention is to provide an improved tubing cutter which may be installed from the side of the material to be cut, rather than requiring installation thereon from the end of the material.

A further object of the present invention is to provide an improved tubing cutter in which the center of the cutting blade is aligned at all times with the perpendicular bisector of the line extending between the two guide rollers, thereby providing for the cutting pressure to center cylindrical material of any practicable diameter between the two guide rollers and precluding asymmetric forces which would cause the material to slip from the tool during cutting operations.

An additional object of the present invention is to provide an improved tubing cutter in which opposite jaws urge the guide rollers and cutting blade together, but which precludes positive attachment of the cutting blade to its adjacent jaw, in order to allow arcuate relative movement of the two jaws and linear relative movement of the cutting blade and guide rollers.

Another object of the present invention is to provide an improved tubing cutter which includes a secondary compression spring to urge the cutting blade away from the guide rollers to provide for automatic opening of the space between the cutting blade and guide rollers when the jaws are spread, with the secondary spring being weaker than the primary closure spring.

A final object of the present invention is to provide an improved tubing cutter for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
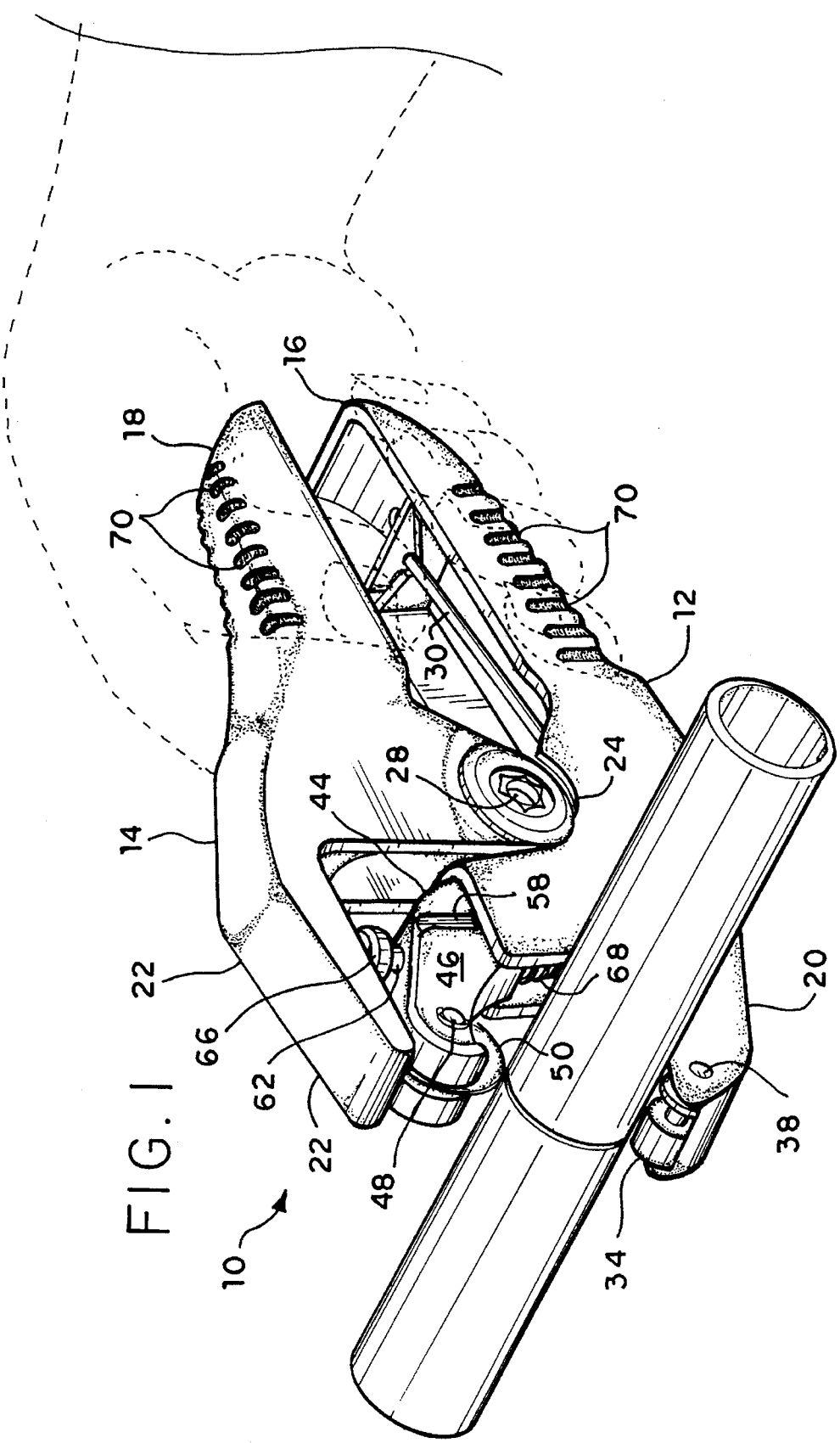
FIG. 1 is a perspective view of the tubing cutter of the present invention, showing its general features.

Referring now particularly to FIG. 1 of the drawings, the present invention will be seen to relate to a tubing cutter 10 providing for the circumferential cutting of tubing, pipe, and other cylindrical material. The tubing cutter 10 basically comprises a frame having a first frame half 12 and an oppositely disposed second frame half 14. Each frame half 12 and 14 comprises a handle portion, respectively 16 and 18, and an opposite jaw portion, respectively 20 and 22, each formed as an integral unit.

Each frame half 12 and 14 is configured to provide a common pivot fulcrum 24 serving to connect the two frame halves 12 and 14 pivotally together, with the frame configuration resulting in the jaw and handle portion of each frame half being disposed to the same respective side of the pivot fulcrum 24. This results in the two jaw portions 20 and 22 being spread when the two handle portions 16 and 18 are closed, and the jaw portions 20/22 being closed when the handle portions 16/18 are spread from one another.

The two handles 16/18 are constantly urged apart to a spread configuration, and the two jaws 20/22 are consequently urged together to a substantially closed position, by a clamping spring 26 coiled about the transverse pivot pin 28 which passes through the pivot fulcrum 24. This construction is more clearly shown in FIGS. 2 and 3 of the drawings. The spring 26 includes opposite first and second extensions 30 and 32, captured respectively within the substantially hollow first and second handles 16/18, and serving to resiliently urge the two handles 16/18 apart (and thus to resiliently urge the two jaws 20/22 to clamp together). The spring 26 provides substantial closure force for the two jaws 20/22, and provides all of the force required for cutting pressure, without any need for further pressure from the user of the tool 10.

The first jaw 20 includes a first and a second guide roller, respectively 34 and 36, installed laterally therein (i. e., with their axes defined by pins 38/40 disposed parallel to the pivot pin 28) and spaced slightly apart. The guide roller assembly comprising the rollers 34/36 and their respective axes and pins 38/40 serve to support the cylindrical material which is being cut using the present tool 10. The roller pins 38/40 are preferably immovably affixed within the first jaw 20, thereby precluding any movement other than rotation of the rollers 34/36 within the first jaw 20.

Figure 3:
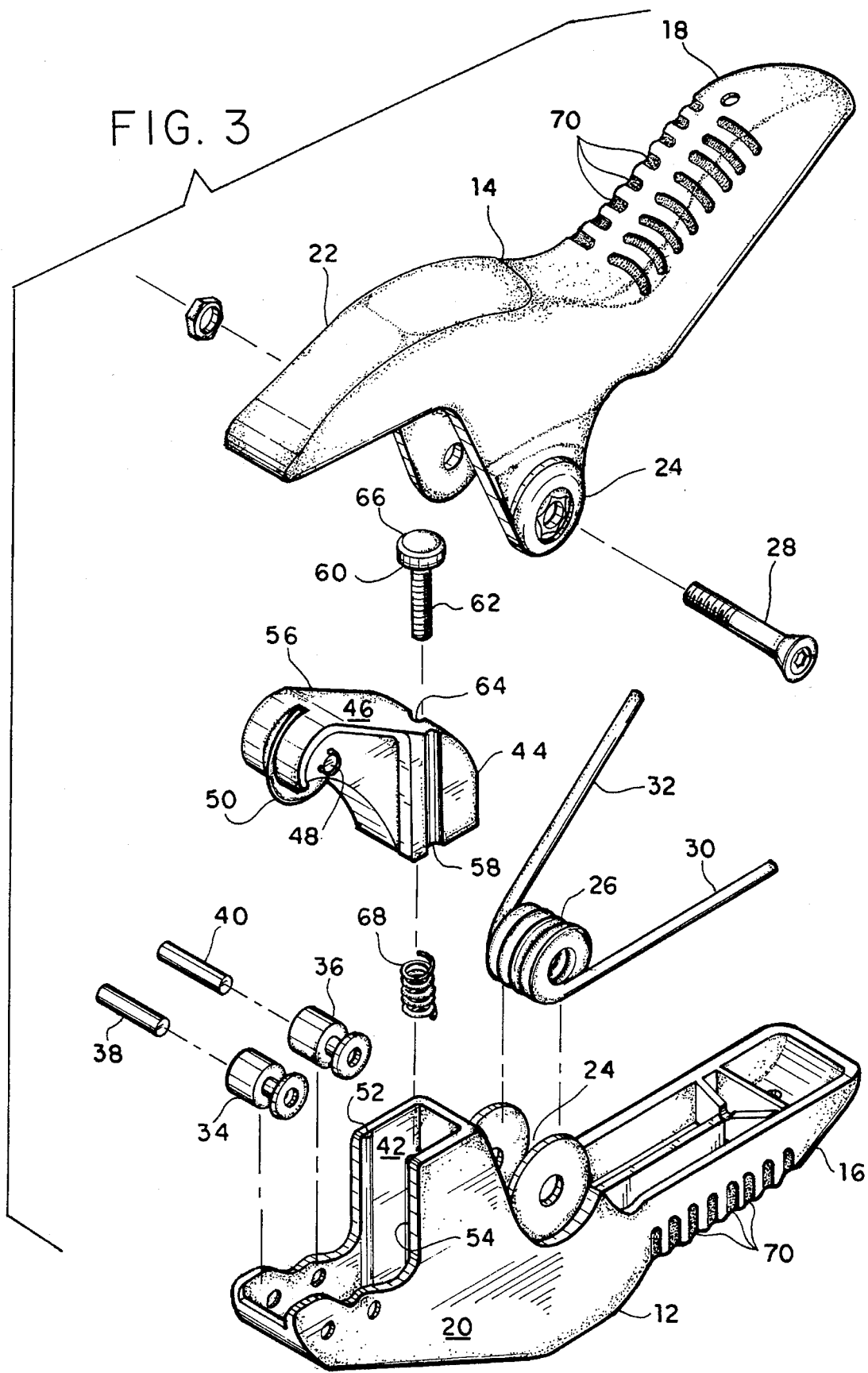
FIG. 3 is an exploded perspective view of the present tubing cutter, providing further disclosure of the assembly thereof.

The guide roller assembly further includes a channel 42 disposed behind the two guide rollers 34/36, with the channel 42 forming a linear path for the sliding travel of a cutting blade assembly 44 captured therein. The cutting blade assembly comprises a cutting blade block or housing 46, a cutting blade pin 48 passing transversely through the housing 46, and a circular cutting blade 50 rotating on the pin 48. The housing or block 46 has an external shape adapted to closely fit the inside of the channel 42 and to preclude any significant movement of the block 46 relative to the channel 42 in any direction other than longitudinally within the channel 42. The channel has opposite first and second raised tracks or ridges 52 and 54 longitudinally disposed on opposite walls thereof, and the cutting blade block 46 includes cooperating grooves 56 and 58 formed therein, as shown in FIG. 3. The cutting blade pin 48, and thus the cutting blade 50, are thus captured with their axes disposed parallel to the axes of the two guide rollers 34 and 36.

Figure 2:
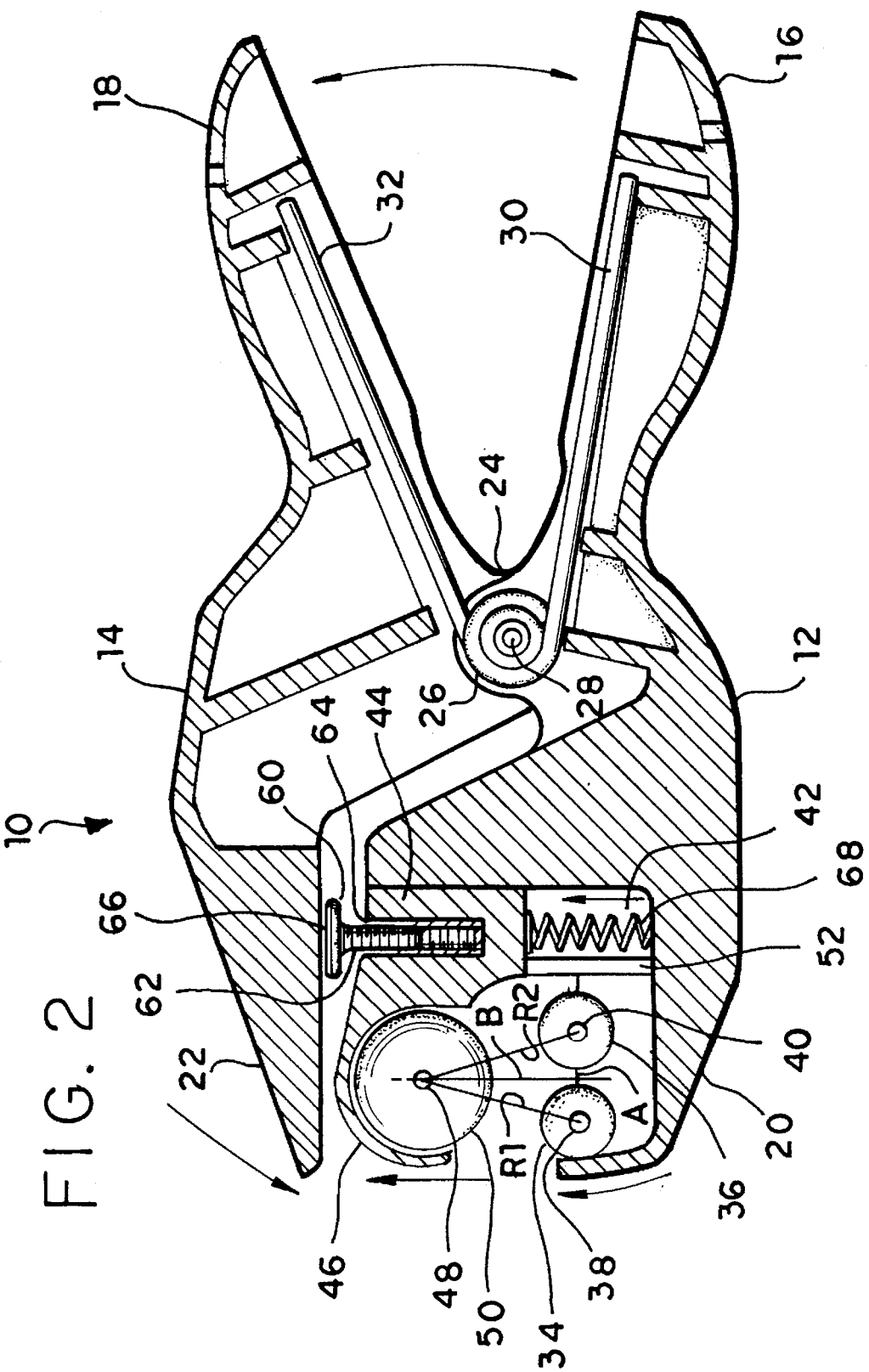
FIG. 2 is a side view in section of the present tubing cutter, showing details of its operation and the relationships between the various components thereof.

The cutting blade 50 is positioned somewhat forwardly of the major portion of the cutting blade block 46, in order to center the blade pin 48 on a line between the two guide rollers 34 and 36. The precise relationship is shown in FIG. 2, with a perpendicular bisector B projected from the centerline A between the two guide roller axes/pins 38 and 40. It will be seen that the perpendicular bisector B passes through the axis or pin 48 of the cutting blade, thereby defining equal distances R1 and R2 respectively between the first guide roller axis pin 38 and the cutting blade axis pin 48, and the second guide roller axis pin 40 and the cutting blade axis pin 48. This relationship is retained at any spacing of the cutting blade 50 from the guide rollers 34/36, as the movement of the cutting blade block 46 within the channel 42 is parallel to the perpendicular bisector B. This relationship is important, as it provides for all compressive loads on any cylindrical material being cut by the present tool 10, to pass diametrically through the material C and thus preclude any asymmetric loads which would tend to eject the material from the tool 10.

The above described structure will be seen to preclude any direct contact between the cutting blade 50 and cutting blade block 46 which holds the blade 50 therein, and the second jaw 22 of the present tubing cutter tool 10. Contact between the cutting blade 50 and the second jaw 22 is only through the cutting blade housing 46, which rides in the channel 42 contained in the first jaw 20 of the tool 10, and thence through the pivot fulcrum 24 to the second frame half 14. Thus, no arcuate movement of the second frame half 14 relative to the first frame half 12, is transmitted to the cutting blade 50, to disturb the optimal linear motion of the blade 50 described above relative to the guide rollers 34/36.

However, some means must be provided to apply pressure to the cutting blade 50, against any cylindrical material within the present cutter 10, in order to provide cutting force. This is accomplished by a bearing 60 disposed between the cutting blade block 46 and the second jaw 22, and further precluding any direct contact therebetween. The bearing 60 includes a threaded shank 62, which is adjustably threaded into a cooperating threaded hole 64 in the cutting blade block 46 to provide spacing adjustment between the cutting blade block 46 and the second jaw 22. The opposite end of the bearing shank 62 includes a low friction pad or head 66 thereon (e. g., Teflon - tm, or other suitable material) which bears against the underside of the second jaw 22. Thus, the difference between the linear motion of the cutting blade block 46, and the arcuate motion of the second jaw 22, relative to the first jaw 20, is accommodated by the sliding of the bearing 60, and more specifically the low friction bearing head 66, on the undersurface of the second jaw 22, to urge the cutting blade against any cylindrical material within the present tool 10.

The above described bearing means provides another advantage due to the adjustability of the threaded shank 62 providing for the adjustable spacing of the bearing head 66 from the top of the cutting blade block 46. It will be seen that the clamping spring 26 provides greater force or pressure at greater deflections, i.e. where the jaws 20/22 are spread to a greater separation to accommodate larger diameters of materials. Generally, the greater cutting pressure thus provided is desirable with such larger diameter materials, but it may be desirable to reduce the cutting pressure (e. g., when cutting plastic tubing, to reduce crushing forces), or conversely to increase the cutting pressure for cutting relatively small diameter tubing formed of harder materials (e. steel brake lines, etc.).

The adjustability of the bearing head 66 distance from the cutting blade housing 46 enables the distance between the cutting blade 50 and the guide rollers 34/36 to be reduced for cutting smaller diameter materials, and similarly for the jaws 20/22 to require greater opening (and thus greater deflection of the clamping spring 26, and the resultant greater spring force provided) for a relatively smaller diameter of material. Thus, relatively large cutting pressures may be developed, even with relatively small spacing between the cutting blade 50 and the guide rollers 34/36, by threadedly withdrawing the bearing shank 62 from the top of the cutting blade housing 46, to require greater closure of the handles 16/18 (and deflection of the spring 26) to spread the jaws 20/22 to a greater extent. This adjustment need be accomplished only once, before the tool 10 is applied to the cylindrical material C to be cut, rather than requiring continuous adjustment, with conventional tubing cutters and the like.

As the cutting blade block 46 is free to slide linearly within the channel 42, it will be seen that the block 46 and cutting blade 50 may move toward the two guide rollers 34 and 36 to reduce the gap or space therebetween, independently of the position of the two jaws 20 and 22. Unless some means is provided to move the block 46 and cutting blade 50 away from the two guide rollers 34/36, the blade 50 must be manually moved to allow for the insertion of material between the rollers 34/36 and the cutting blade 50, even when the handles 16/18 are compressed to spread the two jaws 20/22. This relatively cumbersome process is precluded by the provision of a relatively weak secondary compression spring 68 disposed within the channel 42, serving to urge the cutting blade block 46 (and thus the cutting blade 50) away from the two guide rollers 34/36. The clamping spring 26 provides considerably more closure force upon the two jaws 20/22, easily overcoming the relatively weak force of the roller and cutting blade spreading spring 68. However, when the two handles 16/18 are compressed to open or spread the jaws 20/22, the relatively weak spring 68 is released to push the cutting blade block 46 away from the two guide rollers 34/36, thus automatically widening the space between the rollers 34/36 and the blade 50 to allow the cutter 10 to be passed over the diameter of the material to be cut.

In conclusion, the above described cylindrical material cutting tool 10 will be seen to provide a hand tool which eliminates many of the cumbersome tasks required in the operation of other tubing cutters and the like of the prior art (manually adjusting the cutting wheel position after each turn or two of the tool around the material, etc.), and yet does so with a relatively neat and simple mechanism requiring only one hand for use. This is particularly valuable when loose stock is to be cut, as the operator's second hand is then free to position the material within the rollers and cutting blades of the present tool 10, without being required to adjust the position of the cutting wheel or blade within the tool jaws. The elimination of direct attachment of the cutting blade to the jaw opposite the guide rollers, obviates any need for complex linkages between cutting blade and tool jaws, and/or between the guide rollers and tool jaws, to maintain the proper relationship between rollers and cutting blade. Yet, the present tool 10 maintains a constant relationship between those components, wherein any diameter of cylindrical material grasped therein always has all cutting pressures passing through the center of the material, thus precluding any asymmetric forces which would tend to push the material from the jaws.

A user of the present tool need only squeeze the two handles together to spread the jaws, and place the tool on the material to be cut. The tool handles may include some form of grip means 70 (roughened or textured surface, etc.) to provide a better grip for the user, as the spreading force of the spring 26 within the handles 16/18 may be substantial, in order to provide the desired cutting force. Nevertheless, the present tool 10 may be formed of relatively lightweight materials if desired, with the two frame portions or halves formed of a relatively high density plastic material, if desired. Other materials (metals, etc.) may be used as desired. If greater or lesser cutting pressures are desired for the diameter of the material being cut, depending upon the specific material, the spacing between the bearing head 66 and the cutting blade housing 46 may be adjusted as desired to increase or decrease cutting pressure for a given diameter of material being cut.

The result is a tool which requires only one hand to adjust and to place on the material to be cut, to cut the material by rotating the tool around the material (or the material within the tool), and to remove the tool, thus considerably simplifying the task of cutting tubing, pipe, and other cylindrical materials. The economy of the present tool 10, due to its lack of complex and delicate adjustment mechanisms, provides further advantages over devices of the prior art.

It is to be understood that the present invention is not limited to the sole embodiment described above, but encompasses any and all embodiments within the scope of the following claims.

I claim:

1. A hand operated tool for use in cutting tubing, pipe, and other cylindrical materials, said tool comprising:

a frame having a first frame half integrally formed of a first jaw and first handle and a second frame half integrally formed of a second jaw and second handle, with said frame further including a pivot fulcrum disposed between said first frame half and said second frame half and pivotally connecting said first frame half and said second frame half together in a relationship wherein movement of each said handle toward one another simultaneously causes each said jaw to move away from one another in an arcuate path about said pivot fulcrum, and movement of each said handle away from one another simultaneously causes each said jaw to move toward one another in an arcuate path about said pivot fulcrum;

clamping spring means disposed within said frame and urging each said jaw together with sufficient pressure to provide for cutting of material by said tool;

said first jaw including first and second guide roller pins immovably affixed therein and including spaced apart first and second guide rollers having axes disposed laterally within said first jaw, with said axes of said first and second guide rollers having a common center line extending therebetween, and with said guide roller pins and said guide rollers comprising a guide roller assembly;

a cutting blade assembly including a rotating cutting blade with an axis disposed parallel to said axes of said guide rollers;

said cutting blade assembly and said guide roller assembly having cooperating means slidably securing said cutting blade assembly to said guide roller assembly, and said cutting blade assembly further being devoid of direct connection means to said first jaw and said second jaw, except by said cooperating means slidably securing said cutting blade assembly to said guide roller assembly affixed within said first jaw;

said cooperating means slidably securing said guide roller assembly to said cutting blade assembly further providing for the constant disposition of said cutting blade axis along a straight path defining a perpendicular bisector to said common center line of said first and second guide roller axes, thereby maintaining an equal distance from said first guide roller to said cutting blade and from said second guide roller to said cutting blade as said cutting blade assembly is moved relative to said guide roller assembly, whereby;

sufficient pressure is exerted upon each said handle to force each said handle together against said clamping spring means and to spread each said jaw from one another and further to allow said cutting blade to be moved apart from said guide rollers, cylindrical material is placed between said guide rollers and said cutting blade, the pressure on each said handle is relaxed to allow each said handle to spread apart relative to one another and to cause each said jaw to close about the cylindrical material with said cutting blade assembly and the cylindrical material being clamped between said second jaw and said guide rollers to apply cutting pressure to the cylindrical material, and said tool and said cylindrical material are relatively rotated about one another to cut the material.

2. The tool of claim 1, wherein:

said pivot fulcrum includes a pivot pin disposed laterally therethrough and said clamping spring means comprises a coil spring disposed about said pivot pin, with said coil spring having opposite first and second extensions disposed respectively within said first handle and said second handle and urging each said handle apart from one another.

3. The tool of claim 1, wherein:

said guide roller assembly includes a channel formed therein with said channel having an opening facing said first jaw and said guide rollers, and said cutting blade assembly has an external shape closely fitting said channel of said guide roller assembly, and;

said cooperating means slidably securing said guide roller assembly to said cutting blade assembly comprises opposite parallel raised and facing first and second tracks formed within said guide roller assembly channel and adjacent said opening thereof, and opposite parallel first and second grooves formed in said cutting blade assembly and adapted to fit respectively said first and second tracks of said guide roller assembly channel, whereby;

said cutting blade assembly is held in a slidingly movable relationship with said guide roller assembly, with said cutting blade being constantly held equidistantly from said first guide roller and said second guide roller to preclude other than diametric forces being exerted by said cutting blade on cylindrical material being held between said guide rollers and said cutting blade.

4. The tool of claim 1, wherein:

said guide roller assembly includes a compression spring therein, serving to urge said cutting blade away from said guide rollers when said first jaw and said second jaw are spread apart, and;

said compression spring is substantially weaker than said clamping spring means urging each said jaw together, thereby allowing said clamping spring means to overcome said compression spring and urge said first jaw and said second jaw together to clamp cylindrical material between said cutting blade and said guide rollers when pressure on said first handle and said second handle is released.

5. The tool of claim 1, including:

a bearing disposed between said cutting blade assembly and said second jaw, with said second jaw slidably contacting said bearing to urge said cutting blade assembly toward said guide roller assembly, and with said bearing allowing relative movement between said cutting blade assembly and said second jaw when said second jaw is moved relative to said first jaw arcuately about said pivot fulcrum and said cutting blade assembly is moved linearly relative to said guide roller assembly when said first handle and said second handle are urged together.

6. The tool of claim 5, wherein:

said bearing includes a threaded shank cooperating with a threaded passage within said cutting blade assembly, with said threaded shank and threaded passage providing threaded adjustment of spacing of said bearing from said cutting blade assembly.

7. The tool of claim 5, wherein:

said bearing includes a low friction bearing surface.

8. The tool of claim 1, wherein:

at least said first frame half and said second frame half are formed of plastic material.

9. The tool of claim 1, wherein:

said first handle and said second handle each have an interior comprising a substantially hollow channel.

10. The tool of claim 1, wherein:

said first handle and said second handle each include grip means thereon.

* * * * *